No. 726,862. PATENTED MAY 5, 1903.
U. DE CIVRY.
BRAKE.
APPLICATION FILED JULY 30, 1902.
NO MODEL.
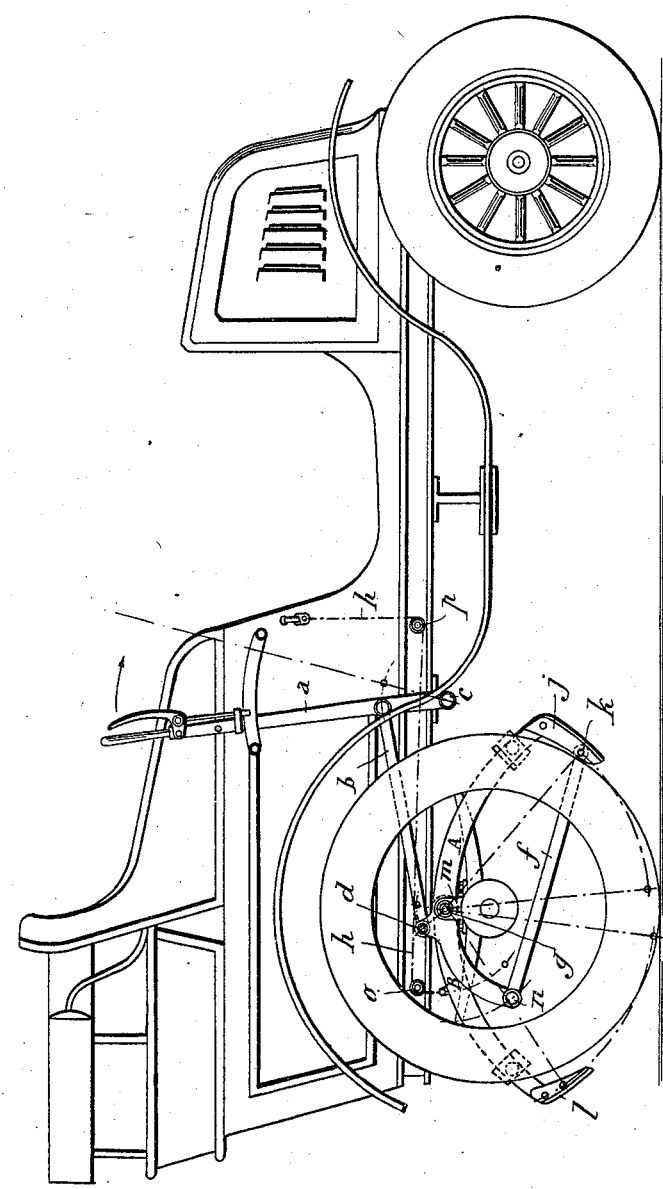

No. 726,862. Patented May 5, 1903.

UNITED STATES PATENT OFFICE.

ULRIC DE CIVRY, OF PARIS, FRANCE.

BRAKE.

SPECIFICATION forming part of Letters Patent No. 726,862, dated May 5, 1903.

Application filed July 30, 1902. Serial No. 117,724. (No model.)

*To all whom it may concern:*

Be it known that I, ULRIC DE CIVRY, a citizen of the French Republic, and a resident of Paris, France, have invented certain new and useful Improvements in Brakes, of which the following is a specification.

Up to the present braking action has been produced by consuming by means of friction the momentum of the vehicle which it was desired to arrest. This friction was produced in the case of blocks or shoe-brakes by forcing the blocks against the rim of the wheel and in the case of band-brakes by tightening the brake band or strap. According as the speed of vehicles and particularly of motor-vehicles increased, the want was felt of a braking means which should be more effective than the ordinary brakes. In the brake which forms the subject of the present invention this effective action is produced by arranging the brake-block in the form of a shoe or skid which takes under the wheel when the brake is applied. By this means the wheel comes out of contact with the ground and can at most revolve on the brake-shoe when the latter is applied—for instance, when the wheel is driven by a motor. The wheel when braked in this manner can no longer cause the vehicle to move forward and the vehicle is only able to slide forward by reason of its momentum with the brake-shoe along the ground, and it will come to a standstill in a very short time. The action of the brake is therefore extremely effective.

The accompanying drawing shows by way of example my brake applied to a motor-car.

The brake-shoe $j$, of any suitable shape, is fixed to a lever A, which is pivoted on an axle $g$, that is carried by supports $m$, fixed on the rear suspension-springs of the vehicle. The lever A carries an extension $d$, which is connected to a connecting-rod $b$, that is movably jointed at its other end to the operating-lever $a$. At the end $n$ of the lever A there is pivoted at $n$ a connecting-rod $f$, which is pivoted at $k$ to the brake-shoe $j$ and serves as a stay-rod. If the operating-lever $a$ be pushed in the direction of the arrow, the connecting-rod $b$ will act upon the lever A and will compel it to rock about the axle $g$. The brake-shoe $j$ then moves under the felly of the wheel, which leaves the ground and sliding along with the brake-shoe soon comes to a stop. To take off the brake, it is merely necessary to cause the vehicle to move backward for a slight extent. The wheel will then leave the brake-shoe, which can then be moved up again by throwing back the operating-lever. At the rear of the wheel is arranged a device $l$ in the form of a "lock-shoe," said device being mounted on the end of the lever B, which is pivoted on the common axle $g$. This lever is now raised for travel in the ordinary way into the position shown in the drawing by means of a small cord $h$, which passes around the small pulleys $o$ and $p$, and the free end of which is hooked in any suitable manner within reach of the driver. The object of this arrangement is to enable the driver to stop the vehicle from making any sudden movement backward, which might be caused by the breakage of the chain or by any other accident. For this purpose the lever B is disengaged by its own weight. For this disengagement it is sufficent to release the small cord which holds the lever in the raised position.

The above-described brake is specially suited for motor-cars; but it may also be applied to railway-vehicles, tram-cars, &c.

Having now fully described my invention, what I claim, and desire to secure by Letters Patent, is—

In a device of the class described the combination with a curved lever A pivotally supported and having a downwardly-curved rear end portion of a skid brake-shoe secured to the forward end of the lever, a stay-rod secured at one end to the rear end portion of the lever A and at the other to the skid brake-shoe, a hand-lever in actuating connection with the lever A, a second pivoted lever B, a skid brake-shoe oppositely faced to the like shoe carried by the lever A, and means for detachably securing the lever B in a raised position, substantially as shown and described.

In testimony whereof I have hereunto set my hand in presence of two witnesses.

ULRIC DE CIVRY.

Witnesses:
ADOLPH STURM,
EDWARD P. MACLEAN.